United States Patent
Siegel et al.

(10) Patent No.: US 8,312,097 B1
(45) Date of Patent: *Nov. 13, 2012

(54) SEGMENTING ACCESS TO ELECTRONIC MESSAGE BOARDS

(75) Inventors: Hilliard Bruce Siegel, Seattle, WA (US); Pratik S. Dave, New York, NY (US)

(73) Assignee: IMDb.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,996

(22) Filed: May 15, 2012

Related U.S. Application Data

(63) Continuation of application No. 12/478,214, filed on Jun. 4, 2009, now Pat. No. 8,214,446.

(51) Int. Cl.
*G06F 15/16* (2006.01)
*G06F 7/04* (2006.01)
*G06Q 10/00* (2006.01)
*H04L 9/32* (2006.01)

(52) U.S. Cl. ............ 709/207; 709/206; 709/204; 726/2; 726/4; 726/5; 713/168; 705/5

(58) Field of Classification Search .......... 709/206, 709/207, 204; 705/5; 726/2, 4, 5; 713/168
See application file for complete search history.

(56) References Cited

U.S. PATENT DOCUMENTS

| | | | |
|---|---|---|---|
| 2003/0028525 A1* | 2/2003 | Santos et al. ............... 707/3 |
| 2004/0107159 A1* | 6/2004 | Heil ............... 705/37 |
| 2004/0133799 A1* | 7/2004 | Campbell ............ 713/200 |
| 2005/0021521 A1* | 1/2005 | Wycoff ............... 707/10 |
| 2005/0210145 A1* | 9/2005 | Kim et al. ............... 709/231 |
| 2007/0202899 A1* | 8/2007 | Sweeney ............... 455/466 |
| 2007/0220092 A1* | 9/2007 | Heitzeberg et al. ........ 709/204 |
| 2008/0177834 A1 | 7/2008 | Gruhl et al. |
| 2008/0222712 A1* | 9/2008 | O'Connell et al. ......... 726/7 |
| 2009/0254979 A1* | 10/2009 | Blum et al. ............... 726/4 |
| 2010/0011427 A1* | 1/2010 | Zayas ............... 726/7 |
| 2010/0077457 A1* | 3/2010 | Xu et al. ............... 726/4 |
| 2010/0100725 A1 | 4/2010 | Ozzie et al. |
| 2010/0227605 A1* | 9/2010 | Fournier ............... 455/419 |

* cited by examiner

*Primary Examiner* — Joseph Avellino
*Assistant Examiner* — Aftab Nasir Khan
(74) *Attorney, Agent, or Firm* — Novak Druce+Quigg LLP

(57) ABSTRACT

Systems and methods are provided for fine level access control over message content in an electronic messaging system. Access criteria associated with the message content define requirements that a user must satisfy in order to perform specified actions on message content. The user's complete profile is examined at run time and compared to access criteria to make a real time decision about the level of access that a user should have to message content. Depending on the access criteria associated with content, stronger authentication or weaker authentication of the user profile information may be performed on the user profile to determine the level of access that should be granted to the user.

23 Claims, 6 Drawing Sheets

SEGMENTING ACCESS TO ELECTRONIC MESSAGE BOARDS

CROSS REFERENCE TO RELATED APPLICATION

This application is a continuation of, and claims priority to, allowed U.S. patent application Ser. No. 12/478,214, filed Jun. 4, 2009, entitled "Segmenting Access to Electronic Message Boards," which is hereby incorporated herein by reference for all purposes.

BACKGROUND

Electronic message systems provide virtual forums for users to share ideas and to discuss various topics. Electronic message systems include message board systems, social networking sites, blogs, micro-blogs, collaborative content systems, such as wikis, and other such electronic forums where users contribute create, share, and access content.

Managing who has access to what content can present a daunting challenge to administrators of electronic message systems. For example, in a collaborative content development environment, such as a wiki, the ability to create new content and to edit existing content may be limited. For example, changes to existing content or creation of new content may need to be approved by a moderator.

Blogs are one type of electronic messaging system where an individual, group of individuals, or corporation may post content to a website. Often the content provides commentary on a particular topic of interest and may include text and/or audiovisual components. Readers may be able to post comments regarding blog content. Access restrictions may be placed on blog content to limit who may read and/or post comments to the blog. Micro-blogs are particular type of blog that comprises brief text or audiovisual posts. Micro-blogs often impose strict limits on the size of posts. Access to micro-blog content may be restricted to a groups of invited members or in some instances may be open to be received by anyone who chooses to opt in to receive the micro-blog content. Unlike a traditional blog, which is typically posted to a website, micro-blog content may be disseminated through other channels, such as text messages to a mobile phone or other mobile device.

Social networking services provide users with the ability to construct online communities of people who share common interests. Social networking services may incorporate aspects of other electronic messaging systems, such as blogs and electronic message boards, and may provide additional ways for users to interact, such as email or instant messaging services. Various restrictions may be imposed on who may post content and who may view content posted by other users.

Electronic message boards provide another forum for sharing ideas and discussing various topics. Content in electronic message board systems is often arranged into threads that correspond to a particular topic. Users may submit content in the form of posts to be displayed as part of a thread. In some message board systems, the ability to create new threads is limited to administrators, while in other messages board systems, some or all users may have the ability to create new discussion threads. A message board system may be divided into various "boards" devoted to a finite set of subject matter, such as a movie message board where users may discuss topics related to movies, such as recent movie releases, favorite actors and actresses, or movie directors. Each board may be organized into a number of separate discussions or "threads" that are typically dedicated to a specific topic related to the subject matter of the message board. Each thread may include a number of "posts" or messages that users have posted to the message board. Users may view the posts that other users have added to the message board, reply to other users' posts, post a new message to a thread, or even create a new thread. Some messages boards control access to the message board content by requiring a user to log on to the messages boards system before the user can post messages to a thread or create a new thread. Once a user has been logged in or authenticated by the message board system, the user can post messages to any message board in the system.

Managing user access to the message boards presents a number of challenges to administrators. If any user is able to access all content and to post to all threads, the open nature of the message board may lead to abuse. For example, some users (referred to as "trolls") may intentionally post inflammatory messages on a message board in order to provoke an emotional response from other users and to disrupt the discussions taking place on the message board. Trolls and others posting abusive or inflammatory content may easily ruin the experience for other users and may sufficiently disrupt discussions to the point that other users lose interest in the message boards. To make matters worse, organized groups of trolls sometimes target certain message boards and cooperatively disrupt the discussions taking place on these message boards.

Some message boards restrict the ability of users to access and/or post new content, but if user access to a message board is too restrictive, discussions may be stifled because users cannot easily contribute to the discussions and users may lose interest. Some message board systems use moderators to monitor discussions on message boards. In some message boards systems, a moderator may review all messages submitted by users before the messages are actually posted to the message board. In other message board systems, the moderator may have the power to delete messages that have been posted by users and to block disruptive users. However, in some situations, the sheer volume of content that may be posted to some message board systems precludes the use of moderators to monitor all content that is posted to the message boards.

BRIEF DESCRIPTION OF THE DRAWINGS

Various embodiments in accordance with the present disclosure will be described with reference to the drawings, in which.

DETAILED DESCRIPTION

Figure 1:
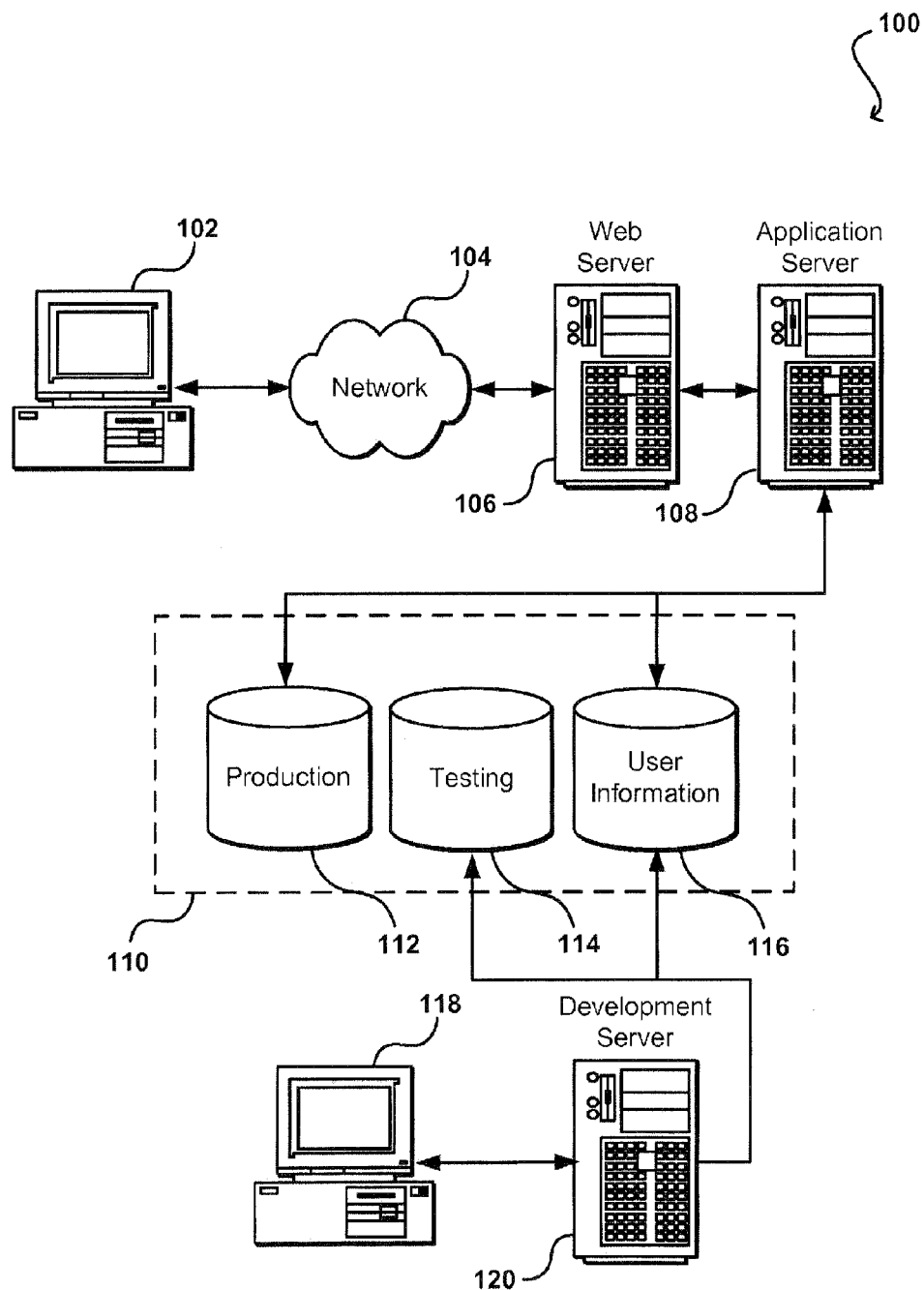
FIG. 1 illustrates an environment in which various embodiments can be implemented.

Systems and methods in accordance with various embodiments of the present disclosure may overcome one or more of the aforementioned and other deficiencies experienced in conventional approaches to managing the ability of users to access and post content to electronic message systems. As is known in the art, electronic message systems provide an electronic forum for people to discuss ideas and exchange information.

Systems and methods are provided for varying levels of access control over electronic message system content. Access criteria associated with the message content can be used to define requirements that a user must satisfy in order to perform specified actions with respect to message content. In one embodiment, a user's complete user profile is examined at run time and compared to the access criteria to make a real-time decision about the level of access to message content that the user should be granted. Depending at least in part on the access criteria associated with content, stronger authentication or weaker authentication of the user profile information may be required.

Where stronger authentication is required to grant the user access to electronic message system, the user's profile information may be verified using an information source or sources that are not easily falsified or replicated. For example, strong authorization may be performed using a user's credit card information, transactional account information on an ecommerce site, or by confirming a user's mobile phone number by sending a short message service (SMS) message to a user's mobile phone handset. For each of these information sources, the user typically must provide accurate information in order to obtain the account or line of credit. For example, a user's credit card information might be used to verify the name and billing address information of the user. The transaction account information might be used to verify a billing and/or shipping address for the user if the user has completed a transaction with the ecommerce site. Sending an SMS message including an access code to the user's mobile phone and requesting a return message be sent from the handset that includes the access code to verify that the user is in possession of the a mobile handset having a specified number. These examples merely illustrate a few types of stronger authentication that might be performed to verify details included in the user's profile information. A user who passes a stronger authentication check may be able to access more message content and perform more actions on the message content (e.g. post new messages or create new threads, among other activities) than a user who merely passes a weaker authentication.

Where weaker authentication is acceptable for granting the user access to message content, user access may be granted based on user-provided information such as zip code, age, and gender, or based on a pattern of user behavior. Some user-provided information may be cross checked against information sources, such as telephone directories and/or other publicly available information sources.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
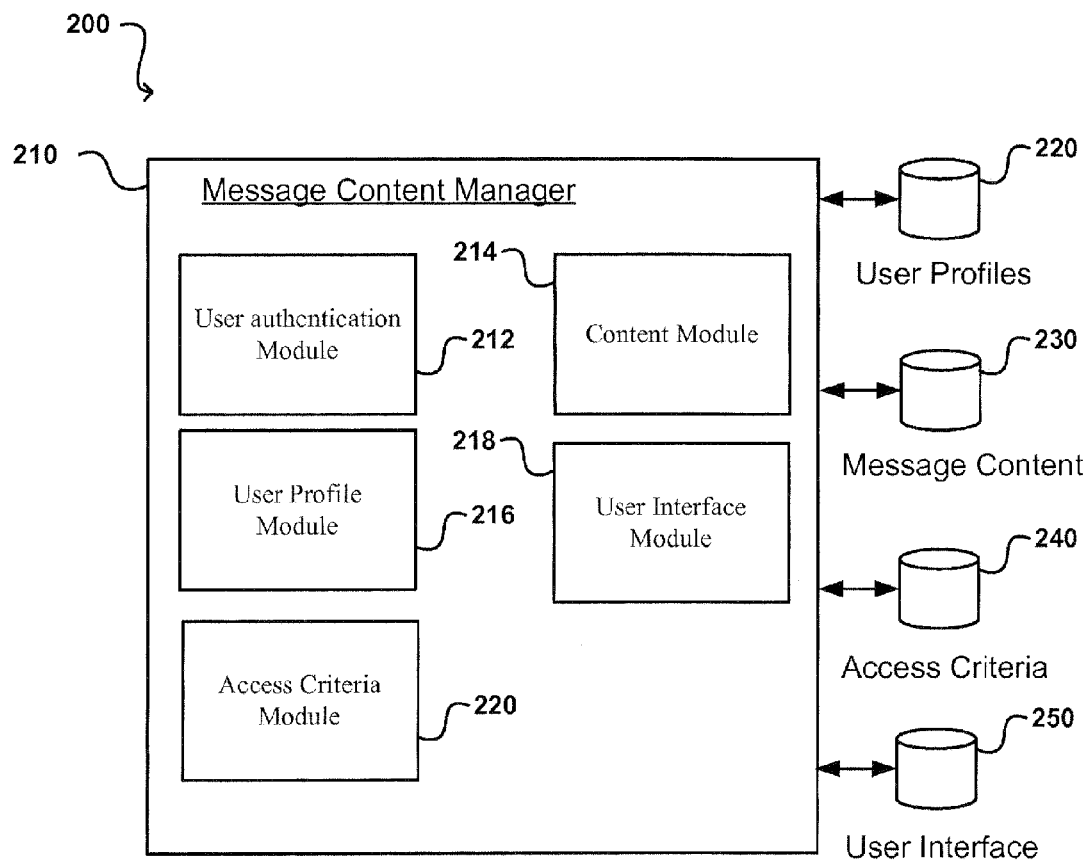
FIG. 2 illustrates components for managing access to message board content that can be used in accordance with one embodiment.

An environment such as that illustrated in FIG. 1 can be useful for a electronic message system provider, such as an online message board provider, a blog provider, a wiki provider, or a micro-blog providers, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2. In this example, a message content manager 210 responds to user requests to access or create message content and performs real time authentication as the user requests are received to determine whether the users are permitted to perform the requested actions. Users may be allowed different levels of access to various message board content. For example, a user of a message board system might have read access to some threads, the ability to post replies to messages on other threads, and/or the ability to create new threads. Message content manager 210 includes user authentication module 212, content module 214, user profile module 216, user interface module 218, and access criteria module 220.

Message content manager 210 reads and/or writes data to user profile data store 220, message content data store 230, access criteria data store 240, and user interface data store 250.

Data stores 220, 230, 240, and 250 may, in some embodiments, be implemented as part of advertisement manager 210 while in other embodiments of the present invention, data stores 220, 230, 240, and 250 are implemented separately from message content manager 210.

User authentication module 212 receives requests from users to perform an action or actions on message content and determines in real time, as the requests are received, whether the user is authorized to perform the requested action or actions. For example, users may request to read content, reply to an existing message, post a new message to an existing thread, start a new thread, submit an abuse report on a message posted by another user, or to perform other actions on message content. Upon receiving the request, user authentication module 212 determines whether the user has permission to perform the requested action. In an embodiment, user authentication module 212 accesses user profile information stored in user profiles data store 220 and also accesses access criteria associated with the requested action and the requested content from access criteria data store 240. User authentication module 212 determines whether the user has permission to perform the requested action on the requested content based on the user profile information and the access criteria. Different levels of access may be required to perform actions with respect to different threads.

In an embodiment, access criteria module 220 may provide an interface for defining access criteria to be associated with message content using user interface module 218. For example, user interface module may generate a web page or other user interface for receiving access criteria information from a message board system administrator or other authorized user.

In an embodiment, a user creating a new thread on the message board system may also define the access criteria required to perform various actions on the content associated with the thread, such as the access criteria required to read the messages posted to the thread, to post replies to messages in the thread and/or post new messages to the thread.

In an embodiment, an administrator or other authorized user may create default access criteria to be applied to all message content in the electronic messaging system. The default access criteria may be overridden for specific content or group of content by defining a specific set of access criteria for the content or group of content. For example, a system administrator of a message board system may define default access criteria that allows anyone to view or post content in any thread on any message board in a message board system. The system administrator may also define specific access criteria for a group of threads or message board dedicated to discussing issues related to motherhood that require users to be female, as determined by the user profile information, in order to reply to messages or post new messages in the group of threads. Users whose user profile indicates that they are female would be able to post new messages to the group of threads in the message board dedicated to motherhood-related issues, while any user, male or female would be able to read the content posted to the group of threads.

Content module 214 receives requests for message content. For example, a request in a blog system may be to read a particular blog entry or to reply to a blog entry, while a request in a micro-blogging system may be to "follow" or receive micro-blog posts from a particular user. A request in an electronic message board system may be a request to read message content or thread information. In an embodiment, authentication module 212 requests content associated with a user request from content module 214 if authentication module 212 determines that the user has access to perform the requested action on the requested content.

In an embodiment, content module 214 access message content from and stores message content to message content data store 230. Message content data store 230 stores message content for the electronic messaging system and may store other content related to the message content. For example, in an electronic message board system, message content data store 230 may also store thread information and message content related to the threads. If the an action requested by the user includes creating new message content, such as replying to an existing message or posting a new message, content module 214 extracts the new content from the request and updates message content data store 230 to store the user-created content. In an electronic message board system, a blog system, or a social networking system, the user-created content may appear to viewers that subsequently view content on the electronic messaging system. In a micro-blogging system, the new user-created content may be disseminated to users who have subscribed to receive micro-blog posts from the user that created the content.

User profile module 216 provides an interface for accessing and storing user profile information. In an embodiment, user profile module 216 writes user profile information to user profiles data store 220. User profile information may include a unique identifier for a user, such as a login id, and password to prevent others from accessing the electronic messaging system using another users' profile information and to prevent others from updating other users' profile information. In an embodiment, user authentication module 212 may request user profile information from user profile module 216 in order to determine whether a user is authorized to perform a requested action on message content.

User interface module 218 generates a user interface for displaying message content. According to an embodiment, user interface module 218 may generate content formatted using a markup language, such as Hypertext Markup Language (HTML), Extensible Markup Language (XML), or Wireless Markup Language (WML), that may be displayed in executable browser software on a user's computer system or other device capable of browsing Internet content, such as a mobile phone. In an embodiment, user interface module may generate other types of user interface, such as a graphical user interface for displaying message content, where the user interface is not displayed within browser software.

Access criteria module 220 provides an interface for associating access criteria with message content. Access criteria define a set of requirements that must be satisfied in order for a user to be able to perform a specified action on message content. For example, access criteria may be defined that require a user to be eighteen years or older in order to read or post content to a message board discussing adult-related content. In an embodiment, access criteria may be associated with a single thread in a message board system, a group of threads, or the entire message board system. For example, the ability to post to a particular thread dedicated to a discussion of a particular play being put on a theater in San Francisco may be limited to users whose profiles indicate that they live in a San Francisco zip code. Other access criteria may also be associated with message content, such as gender requirements, age requirements, geographic requirements, stated political affiliation, purchase or rental activity requirements (e.g., if user's account history or rental history shows that you've purchased/rented a movie you can access message board threads related to that movie), participation requirements (e.g., a threshold number of previous content postings or length of time as a registered member of the forums, among others), and/or other requirements.

According to some embodiments, certain message content may not be visible at all to users unless the user's profile matches the access criteria associated with the content. For example, in an electronic message board system, a user may not be able to view certain threads or certain message boards if the user does not satisfy the access criteria associated with the threads or with the message boards. The threads or message boards may be hidden from the user so that the user is not even aware of their existence if the user has not satisfied the access criteria associated with this content.

Figure 3:
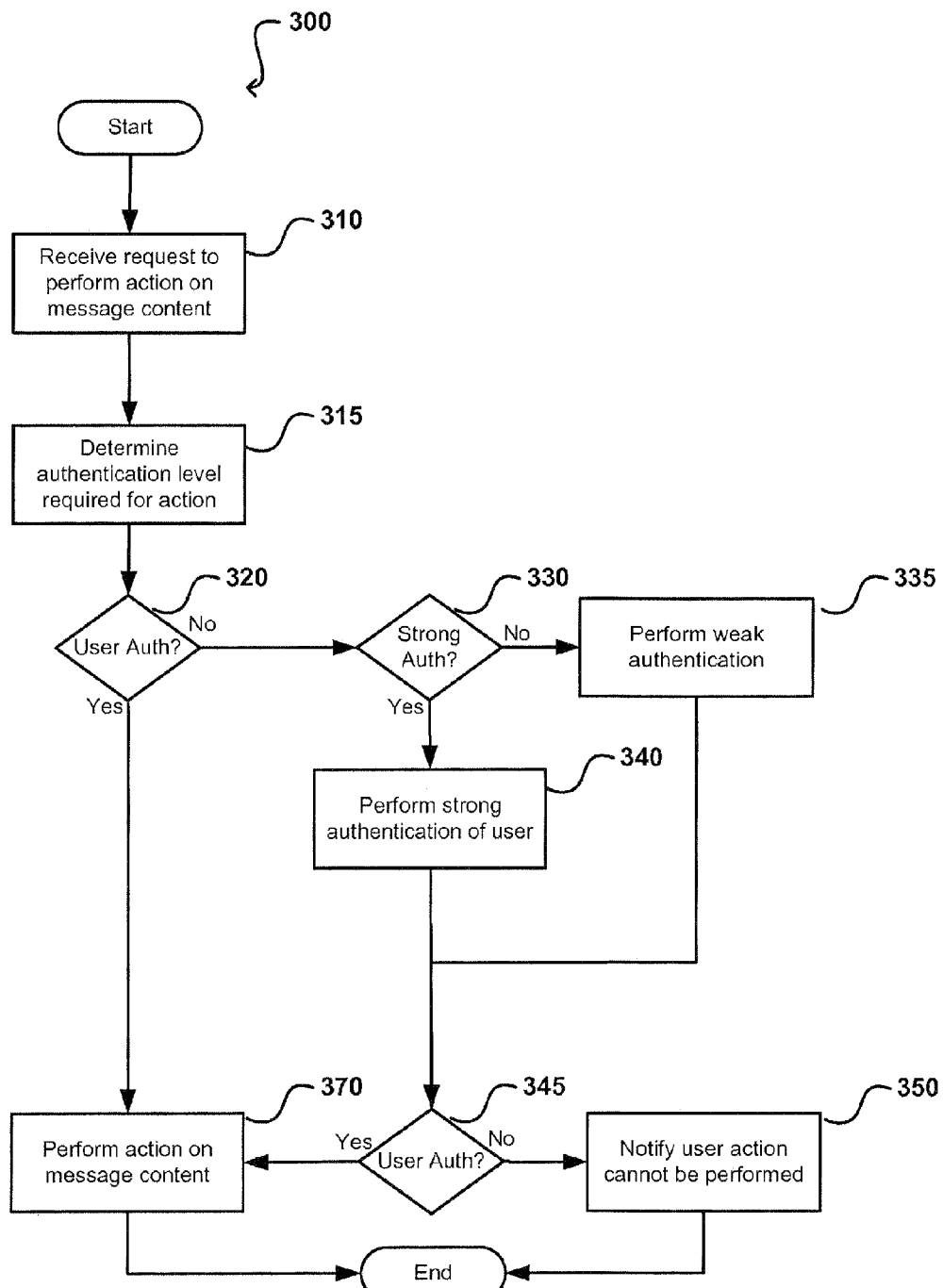
FIG. 3 illustrates steps of a process for controlling user access to content on a message board in accordance with one embodiment.

FIG. 3 illustrates steps of a process 300 for controlling user access to content on a message board system in accordance with one embodiment. A request to perform an action on content message content is received 310. Requests to perform various actions may be received. For example, the request may include a request to view message contents, to post a reply to a message posted on a thread of a message board or a blog, to create a new thread on the message board, to submit an abuse report to the message board system administrators about a post on the message board system, or to edit or delete a post previously made by the user. Other actions may also be requested to be performed by a user depending on the configuration of the message board system. For example, in a micro-blog system, the user may request to receive micro-blog posts from a particular user via text messages or through a browser interface.

An authentication level to perform the requested action on the message content is determined 315. In an embodiment, an authentication module may request access criteria associated with the message content from an access criteria module of a message content manager. The access criteria define a set of requirements that must be satisfied in order for a user to be able to perform a specified action on message content. For example, the access criteria may be associated with a thread that requires users to log in before they can post a message to the thread or reply to messages on the thread. The same thread may also have access criteria that enables any user to view the messages posted to the thread, whether or not the user has logged into the electronic messaging system.

A default set of access criteria may be associated with electronic message system content and more or less restrictive access criteria may be associated with specific message content. For example, in an embodiment, a default set of access criteria may be associated with a thread in a message board system if no specific access criteria has been associated with a thread. The default set of access criteria may enable any user to read posts to the thread but not perform any other actions, such as posting new messages to a thread unless the user logs into the message board system. In another embodiment, the default set of access criteria may able all users to read posts to a thread and to post new messages, and the actions that users can perform on specific threads may be limited by specifying more restrictive access criteria for those threads.

A determination is made to determine whether the user is authorized to have the requested action performed on the message content 320. In an embodiment, the user is authorized to have the requested action performed on the message content if the user profile information for the user satisfies the access criteria. In an embodiment, the user profile of the user is compared to the access criteria to determine whether the user is authorized to perform the requested action. If the access criteria is satisfied, then the action is performed on the message content 370.

Default user profile criteria may also be defined and stored in a user profile data store for use in authenticating requests from unidentified users. The default user criteria may provide limited access to the message content. Some basis information about a user may be able to be determined to supplement the default user profile information, such as deriving an approximate geographic location for a user based on a network address (e.g. an Internet Protocol (IP) address) of the user's computer or determining a user's affiliation with a particular company or institution based on the user's email address.

The user may have been preauthorized to access content before the request is made through a user profile creation process where the user provides information to the electronic messaging system to create an account. Alternatively, the user may have participated in an authentication process in response to a previous request to perform an action on message content, and the authentication information may have been added to the user's profile.

If the user has not previously been authorized to have the requested action performed on the message content, authentication processing may be performed to update the user's profile with additional information about the user that may allow the user to perform the requested action on the message content specified in the user's request. In an embodiment, two types of authentication processing may be performed: (1) stronger authentication or (2) weaker authentication.

Stronger authentication may be performed to verify details about that user profile using an information source that can be used to obtain or verify information about a user and the information source is not easily falsified or replicated. For example, stronger authentication may include verifying the identity of the user using credit card or debit card information, via SMS or text messages sent to and/or from a user's mobile phone handset, banking information, and/or using account details from an ecommerce site where the account has been used to complete a transaction. Some other examples of stronger authentication include: authenticating the user using smart card technology, radio frequency ID (RFID) tags, using audiovisual response provided by the user, and using biometric verification techniques. A user may be authenticated by providing the user with a smart card that contains a security certificate that can be used to identify the user. In some embodiments, a smart card may be used to generate a cryptographic key that can be provided to the site to verify that the user is actually in possession of the smart card.

Audiovisual authentication may also be used. For example, a user may be provided with a phrase or key code that user writes down or prints, takes a photo of his or her self with holding the key code, and transmits a copy of the image to the server to validate that the user is who he or she purports to be. A variation of this technique is to provide the user with a code word or key code and the user captures a video clip of his or her self saying the code work or key code aloud. The video clip is then sent to the server to authenticate the identity of the user.

Biometric authentication may also be used to identify a person based on unique characteristics of the person that could not be easily replicated by another person. Physiological and/or behavioral biometrics may be used. Some examples of physiological biometrics include fingerprint recognition, facial feature recognition, hand and palm geometry, iris recognition, retina recognition, and/or DNA identification. Behavioral biometrics use behaviors of the person to identify the person. For example, voice analysis, gait, and/or typing rhythm are types of behavior might be used to identify a user.

RFID tag technology may be used to authenticate the user. A user may be assigned an ID that includes an RFID tag that may be scanned to identify the user. Some government agencies have begun issuing IDs that include RFID tags that can be scanned to authenticate that the holder of the ID is who they purport to be. For example, passports are now being issued that include electronic identification information that can be read from the passport by customs officials. Other RFID-based ID cards may be issued by non-governmental entities, such as banks or other businesses. For example, a bank may issue a credit or debit card that includes an RFID tag or a business may issue a "loyalty card" to purchasers who have registered with the business and the loyalty card can be used as to identifying the user to corporation.

Weaker authentication may be performed to verify certain details of a user's profile such as zip code, age, or gender. This information may be user-provided information that is not easily verifiable. However, some techniques may be used to increase the likelihood that the user is who they say that they are in their user profile information. In an embodiment, the user's location may be determined from the Internet Protocol (IP) address of the user's computer. In an embodiment, the user's profile information may be provided by the user but may also be cross-checked using information from other publicly available information sources, such as telephone directories, property tax records, or other publicly accessible information. For example, if a user purports to live in a particular zip code, the name of the user could be checked against public telephone directories or property tax records to see if someone having the same name as the user has an address listed in the directory or public property tax records. An exact match may not be possible if multiple people having the same name are located are found in the publicly available records, but a determination that a person of a given name lives within a given area code or at a given address may be possible. In some embodiments, verification of profile information by another forum member that, for example, personally knows the user may be accepted. In such cases, the forum member that provides the verification information may be required to have certain information about themselves previously verified. In some embodiments, a user's patter of behavior may serve as a key for accessing certain electronic message system content. For example, a user may have to have a certain number of associations in a social networking site or have a certain number of subscribers who receive their posts in a micro-blogging system before the user is granted access to specified content.

Figure 4:
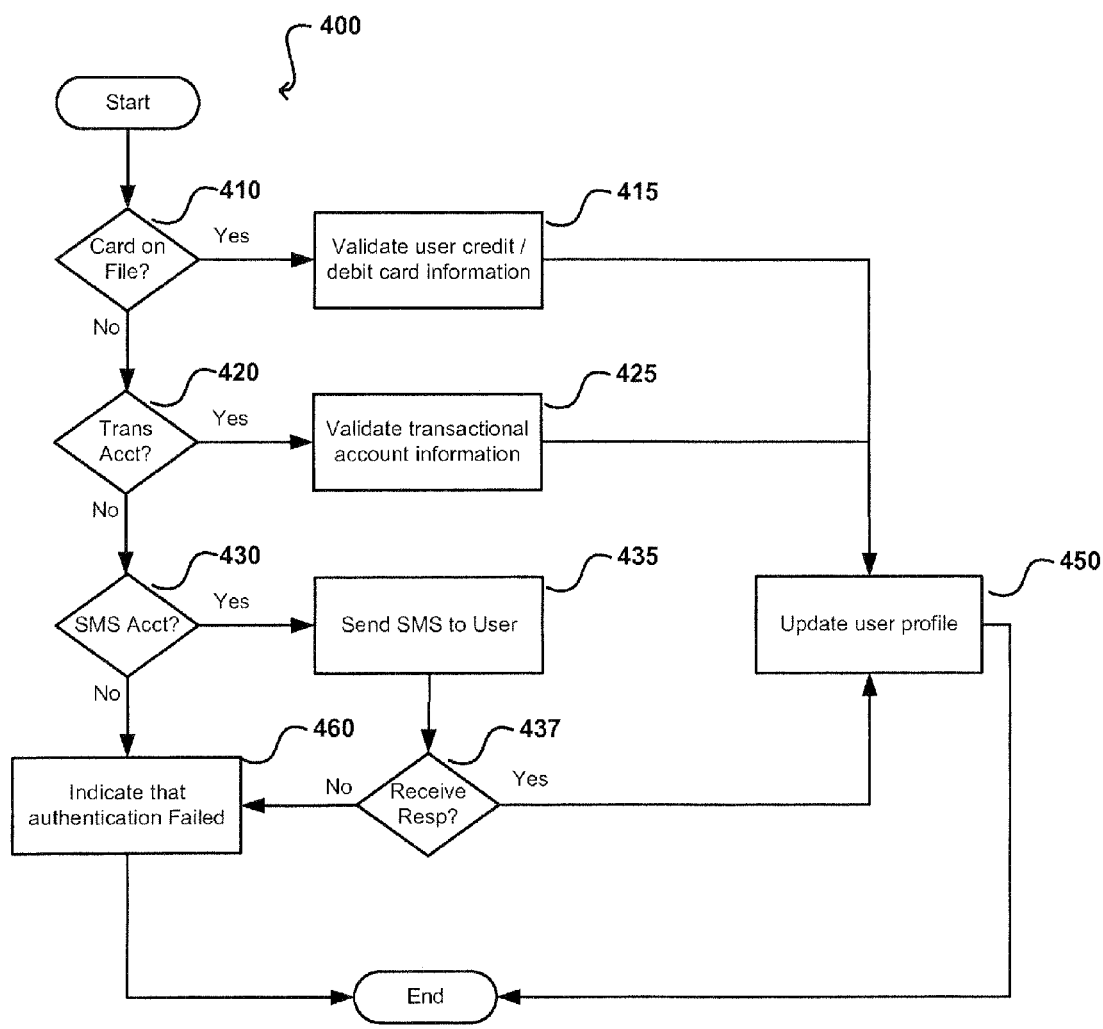
FIG. 4 illustrates steps of a stronger authentication process for authenticating the identity of a user in accordance with one embodiment.

A determination is made whether stronger authentication is required to perform the action requested by the user 330. In an embodiment, whether stronger authentication is required to perform the requested action may be determined using access criteria associated with the message content. Stronger authentication is performed if stronger authentication is required to perform the requested action 340. An embodiment of a stronger authentication process 400 is illustrated in FIG. 4. If stronger authentication is not required, then weaker authentication of the user is performed 335.

After an authentication process has been performed on the user, a determination is made to determine whether the user is authorized to have the requested action performed on the message content 345. In an embodiment, the user is authorized to if the user profile information for the user satisfies the access criteria. In an embodiment, the user profile of the user is compared to the access criteria to determine whether the user is authorized to perform the requested action. If the access criteria is satisfied, the action is performed on the message content 370. If the access criteria is not satisfied, the user is notified that the requested action cannot be performed because the user is not authorized to perform this action 350.

FIG. 4 illustrates steps of a stronger authentication process 400 for authenticating the identity of a user in accordance with one embodiment. Stronger authentication may be performed to verify details about that user profile using information sources that are not easily forged or replicated, such as credit card information, a mobile telephone number, or verified transactional account information. Other information sources that are not easily replicated or forged may also be used in other embodiments.

A determination is made whether credit or debit card information is on file for the user 410. Credit or debit card information is a relatively secure source of information that may be used to verify various personal information of the user. If credit or debit card information is on file for the user, user profile information is validated against the credit or debit card information the user 415. For example, the credit or debit card information may be used to validate an address provided by the user in the user profile information against the name and billing address that the user provided to the credit card company or to the bank issuing the debit card. In an embodiment, the address information may be verified using an address verification service that checks the validity of address information provided by the user against the billing address on file for the credit card. After validating the credit or debit card information, the user profile for the user may then be updated to indicate that the name, address, and/or other information has been validated 450.

If credit card information is not on file for the user, a determination is made whether the user has a transactional account, such as an ecommerce account, where a transaction has been completed 420. If a user has completed a purchase transaction where items have been shipped to the user, the transactional account information may be used to verify information about the user 425, such as the name and the shipping and/or billing address of the user. Payment account information linked to the transactional account may also be used to verify information about the user. Limiting the verification process to include only accounts where the user has completed a transaction helps to prevent users from merely setting up an account or accounts with false information. After validating the transactional account information, the user profile for the user may then be updated to indicate that the name, address, and/or other information has been validated 450.

If the user does not have a transactional account where a transaction has been completed, a determination is made whether the user has provided a mobile phone number where the user can receive text messages 430, such as Short Messages Service (SMS) messages. Setting up a mobile phone account is typically non-trivial and requires a user to provide identifying information the mobile phone service provider. Mobile phone users are often contractually obliged to remain with a service provider for a specified period of time or pay a significant contractual termination fee to end the service before the contract period has expired. These barriers prevent users from simply setting up numerous mobile phone accounts and/or repeatedly canceling service to create a new account with different information.

A text message is sent to the mobile handset 435. The message includes an access code that the user may provide to the message board management system to indicate that the user has possession of a mobile handset. In an embodiment, the response may be a text message sent from the mobile handset that includes the access code. In another embodiment, the text message to the user may include a code that the user may provide to the message board management system to verify that the user received the text message.

A determination is made whether a response is received 437 from the user. If no response is received, the user is notified that the authentication has failed 460, and the user profile information is updated to indicate that the user could not be authenticated via stronger authentication. If a response is received from the user 437, the user profile for the user may then be updated to indicate that the name, address, and/or other information has been validated 450.

In an embodiment, even when strong authorization fails, some information may still be able to be gathered to supplement the information available in the user profile. For example, the user's credit card number may have been a valid credit card number, but the card has expired. But, some information, such as the billing address associated with the credit card, and the name of the cardholder may still be extracted from the credit card information and added to the user profile. Similarly, a user may have a valid transactional account on an ecommerce site, but has not made any purchases within the past year. Even though strong authorization may not be granted because no purchases were made within the past year, billing and/or shipping information from older transactions may still be used to update the user's profile. This additional information was likely to be valid at least at some point in the past, because the information was related to a completed transaction and may still be useful to provide at least some information about the user.

If the user has not provided credit card information, transactional account information, or mobile phone account information, then the user is notified that the authentication has failed 460, and the user profile information is updated to indicate that the user could not be authenticated via stronger authentication.

Process 400 merely illustrates one possible permutation of a validation process that may be performed for stronger authentication of a user. In an embodiment, additional validation steps may be performed on the user profile information, and the order that the validation steps are performed may vary. In an embodiment, some or all of validation steps may be performed sequentially so that multiple validation steps may be performed for a user.

Figure 5:
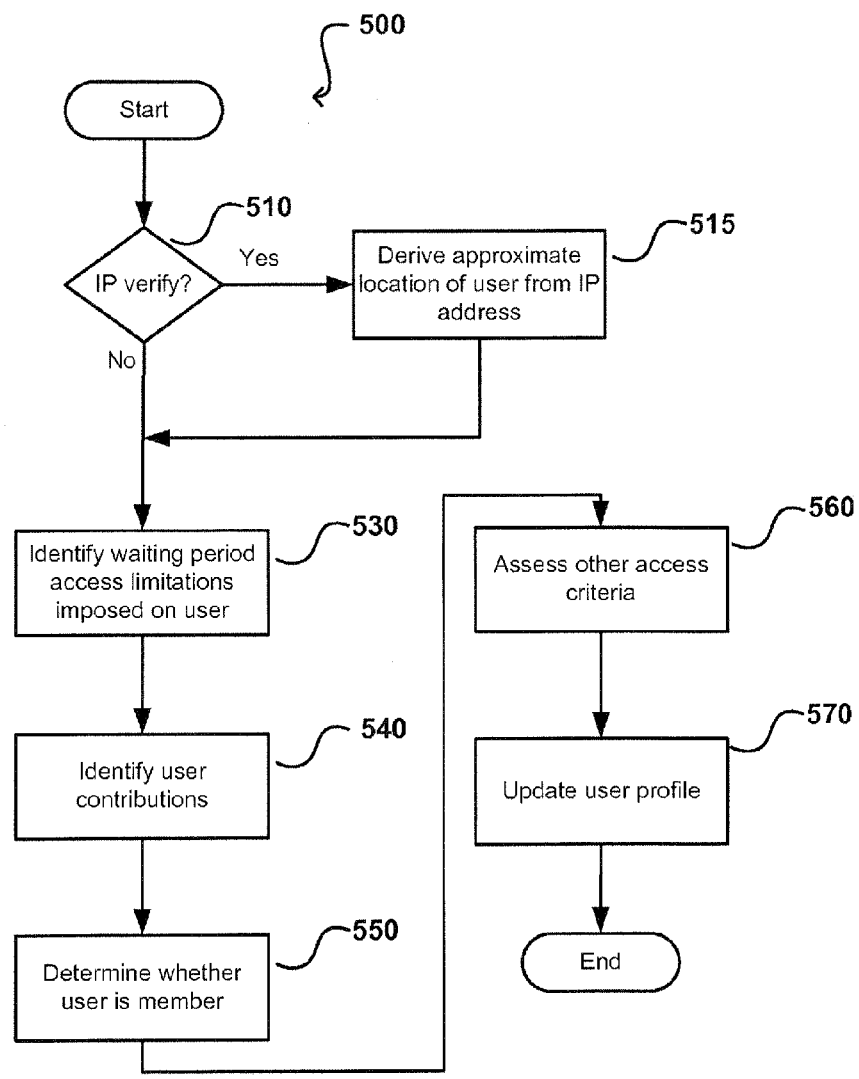
FIG. 5 illustrates steps of weaker authentication process for authenticating the identity of a user in accordance with one embodiment.

FIG. 5 illustrates steps of weaker authentication process 500 for authenticating the identity of a user in accordance with one embodiment. User asserted profile information, such as gender, age, and/or other information may be assessed using a weaker authentication process. In an embodiment, a message board system may not be able to validate some self-asserted information provided by users, but may impose restrictions on the ability of users change such information in their user profiles.

A determination is made whether the Internet Protocol (IP) address of the user is available 510. If the IP address of the user is available, an approximate location of the user may be derived from the IP address 515. In an embodiment, this information may be used to verify user provided address information.

Any time bars or probationary periods placed on the user account 530 are identified. In an embodiment, a message board system may limit the number of times that a user may update some user profile information or may impose limits on the frequency at which this information may be altered. Some self-asserted user attributes may not be easily verified, such as relationship status, gender, number of children, and/or interests in certain topics. Some threads may restrict the ability of users access and/or post content to the thread based on self-asserted attributes. For example, a thread or group of threads might be dedicated to issues related to single parenthood, and the access criteria associated with the thread or group of threads would may require users to have asserted that they are single and that they have at least one child. Since such self-asserted information is not easily verifiable, the message board system may impose limitations on how often or whether a user may change some attributes of the user's profile and/or may impose probationary period after making such a change that limits the access that the user may have to message content has access criteria related to the attributes that the user changed. For example, returning now to the example of the thread or group of threads dedicated to single-parent issues, the message board system may impose a twenty-four hour read-only limitation on users who change their attributes to single with children. After the probationary period has elapsed, the user may be granted additional access, such as the ability to post new comments to a thread or reply to posts. According to an embodiment, asserting one attribute in a user profile may necessarily exclude others. For example, if the user asserts that the he is 27 years old he may granted access to content limited to groups who are 25-35 years old, but he could not assert that he was 18 years old in order to gain access to content limited to people 18-24 years old. In another example, a user cannot assert that the user is both male and female.

User contributions to the message board are identified to determine whether the user has satisfied any contributor limitations that would enable the user to access and/or post messages to threads with contributor limitations 540. In an embodiment, access to some threads may be limited to users who have created at least a certain amount of content for the message board site. For example, a user may be classified as a contributor if the user has created at least one accepted contribution to the site, as determined by a message board administrator or by vote of other users. For example, a user that has generated a review of a movie or a product for posting on a message board or a thread might be classified as a contributor by a message board administrator and would be allowed access to contributor-only content.

Any membership limitations that have been satisfied by the user that would enable the user to access and/or post messages to threads with membership limitations 550 are identified. In an embodiment, a user may be granted access to member-only content if the user has created a member login to the message board system. In an embodiment, the message board system may provide the user with a members-only content, such as a personalized page, and the ability to link posts made to threads on the message board system back to the member's personalized page.

Other criteria related to accessing whether a user may be authorized to access and/or create message content 560. For example, additional criteria may be considered, such as the amount of time that a user has been participating in discussions on the message board system, the number of replies messages that the user has posted in response posts on the message board system, and/or the number of abuse reports that have been filed against the user by other users of the message board system. The additional criteria may also be based on the user's "clickstream" or pattern of behavior within the message board community.

Access criteria may be associated with message content that is based on a user's pattern of behavior. For example, message content may not be visible or even accessible to a user unless the user exhibits a predetermined pattern of behavior. Since the content is not visible to user unless the user exhibits the predetermined pattern of behavior, the user is likely be unaware of the existence of the content. As a result, users who are more likely to have an interest in particular message content may be granted access to the content based on the user's pattern of behavior within the electronic messaging system, while those users who have not exhibited a pattern of behavior that would indicate an interest in the message content would remain unaware of the existence of this content. Basing access criteria on users' patterns of behavior may also help eliminate disruptive or malicious users from accessing the content, because the patterns of behavior of these users would not satisfy the access criteria associated with the content.

In an embodiment, an administrator or user creating new content may define a pattern of behavior that includes various criteria that could be objectively tested to determine whether a user has satisfied the pattern of behavior desired. In some embodiments, an automated process could be used to identify attributes of new content and to define a set of criteria that define a pattern of behavior that a user should exhibit before being granted access to the content. In some embodiments, the content may be viewable by some or all users, but the user may need to exhibit a specified pattern of behavior before being granted the ability to perform additional actions on the content. Thus, entire message boards or threads on message boards, blogs, micro-blogs, and/or other message content may remain hidden from users not exhibiting specified pattern of behavior required to unlock that message content.

In an embodiment, access to specific message board threads may be limited to users exhibiting a specific pattern of behavior. For example, a message board may include a set of threads for which access is limited to long-time members/contributors to the message board system. Long-time members or contributors of the electronic messaging system may be rewarded by providing these users with access to exclusive content not available to other users. Alternatively, the message board system may require that a user be a member for a certain period of time or have contributed by responding to a certain number of messages before the user can create new threads.

Access criteria may also be defined that are associated with undesirable behavior and result in user access to message content being curtailed. For example, if too many abuse reports are submitted about a particular user, the user may be prohibited from posting new messages or responding to existing messages throughout the message board system for a period of time. Curtailing access to message content for users exhibiting bad behavior may encourage the user behave better and may discourage others from exhibiting the same bad behavior.

In an embodiment, a user who browses threads related to a particular actress, posts messages to threads related to movies starring the actress, and has not had any bad behavior reported to the message board administrators may be invited to participate in a "fans only" threads discussing topics related to the actress that are only accessible to users invited to join based on their pattern of behavior. Access to the message content on these threads is effectively locked and the combination to the lock is the pattern of behavior of the user. Users who have not unlocked this content may not even be aware of its existence. As a result, trolls and other wishing to disrupt conversations are not likely to be aware of the "fans only" threads, and will not be likely to replicate the pattern of good behavior required to unlock this content. A user's pattern of behavior may be used to unlock similar or related content based on underlying relations in the data. For example, if a user is granted access to a blog or message board thread discussing a particular movie in which an actress starred, other blogs or message boards discussing other movies in which the actress also starred may be unlocked.

Access criteria defining patterns of behavior that may be used to unlock or lock access to certain message content may also be applied to other types of electronic messaging systems, such as blogs, micro-blogs, and social networking systems. Access criteria associated with message content may be applied across platforms. For example, a micro-blog user that have over a specified number of users that have subscribed to receive posts by the micro-blog user may be granted access to a message board for "superusers" to exchange information about the micro-blog system and to provide feedback and suggestions that may be used by administrators to improve the micro-blog system. In another example, a social networking system may include access criteria that enables a user that has over a certain number of network connections to post blog entries that may be accessed by some or all users of the social networking system. The examples disclosed herein are provided to illustrate how a pattern of behavior might be used to control access to message content, and are not intended to limit the scope of the invention to these specific embodiments.

The user profile information for the user is updated 570 to indicate any of the various access criteria requirements that have been satisfied by the user. These access criteria may enable the user to access additional content in the message board system or to perform additional actions on message content.

Figure 6:
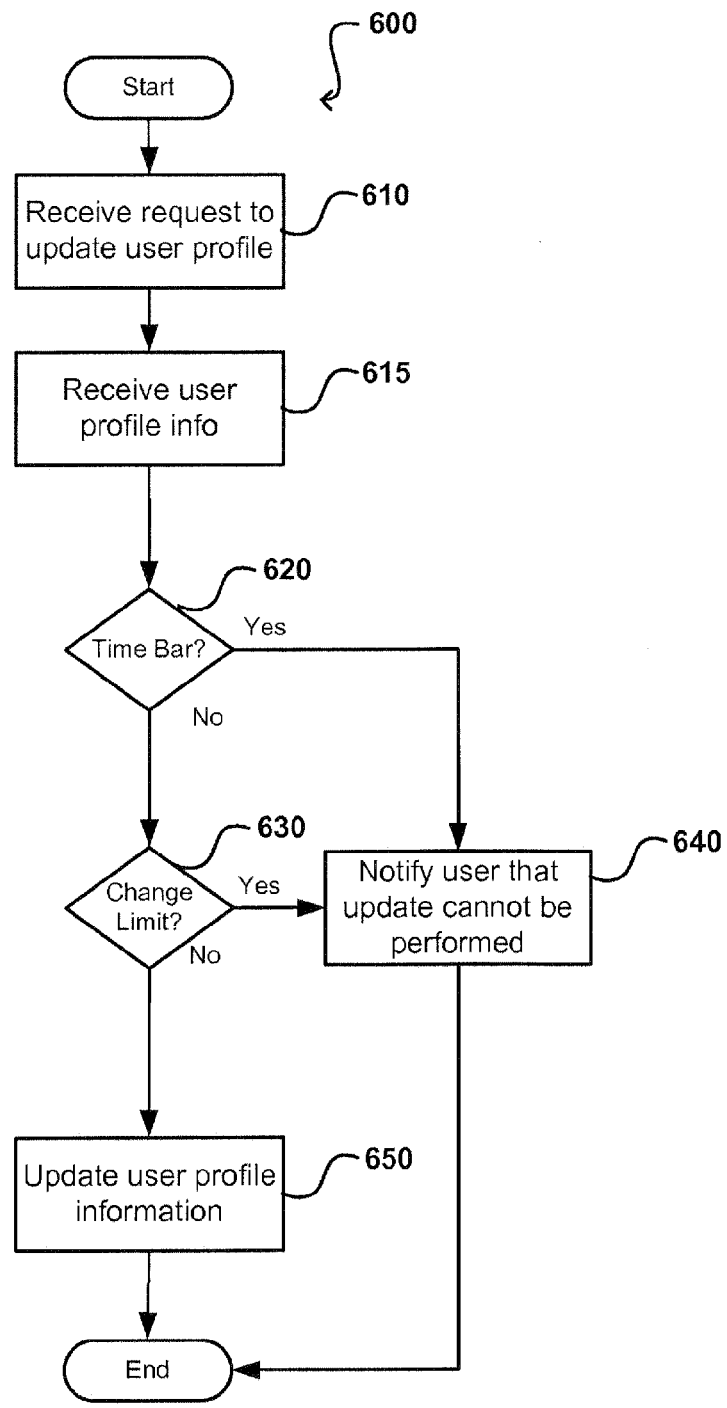
FIG. 6 illustrates steps of a process for updating a user profile in accordance with one embodiment.

FIG. 6 illustrates steps of a process for updating a user profile in accordance with an embodiment. A request to update the user's profile is received by the message board management system 610. The user profile to be updated is accessed 615 in response to the request. A determination is made whether a time bar or probationary period is in force that would prevent the user from updating the profile information 620.

In an embodiment, a message board system may limit the number of times that a user may update some user profile information or may impose limits on the frequency at which this information may be altered, since some self-asserted user attributes may not be easily verified. By limiting the number of times or the frequency with which a user may update some self-asserted information, the message board management system may prevent users from changing their user profile information in order to gain access to content that they otherwise would not be able to access.

If a time bar is in place and the user cannot update the user profile information, the user is notified that the user profile information cannot be updated 640. Otherwise, if no time bar is in place, a determination is made whether the user has reached a limit on the number times that the user profile information may be updated 630. If the user has reached the limit on the number of times that the user profile information may be updated, the user is notified that the user profile information cannot be updated 640. In an embodiment, some information in the user profile may only be updated a limited number of times, while in other embodiments, all fields in the user profile may only be updated a limited number of times. Otherwise, if the user has not yet reached the limit on the number of times that the user profile information may be updated, the user profile information is updated as requested 650. In an embodiment, a combined approach may be used where a user may make updates to the user profile up to a certain number of times within a specified period of time, and if the user exceeds this threshold, a waiting period is imposed before the user may once again be permitted to update the user profile information. In an embodiment, some fields of the user profile may only be set once. For example, some electronic messaging systems may only allow the data of birth field to be set once.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for controlling access to content of an electronic messaging system, the method comprising:

under control of one or more computer systems configured with executable instructions, providing a user interface for displaying at least a portion of the content of the electronic messaging system on a computing device;

receiving, via the user interface, a request to access a selected thread of one or more threads on the electronic messaging system, each thread on the electronic messaging system having access criteria specifying at least a strong level of authentication and a weak level of authentication for accessing the respective thread, wherein the request comprises one of a request to post a new message to the electronic messaging system, a request to create a new thread on the electronic messaging system, a request to read one of the one or more threads on the electronic messaging system, or a request to reply to a message on the electronic messaging system;

retrieving access criteria associated with the selected thread;

in response to receiving the request, determining a level of authentication specified by the access criteria for the selected thread and the request;

authorizing access to the selected thread by validating user profile information associated with the request against the level of authentication specified by the access criteria, the user profile information capable of being validated using a credit card number for the strong level of authentication and capable of being validated using at least one of a gender, an age, or a zip code for the weak level of authentication.

2. The computer-implemented method of claim 1, wherein the level of authentication specified by the access criteria is based upon message content of the thread.

3. The computer-implemented method of claim 1, wherein the user profile information is further capable of being validated using an internet protocol address associated with the request for the weak level of authentication.

4. The computer-implemented method of claim 1, wherein the user profile information is further capable of being validated using transactional account information for a transactional account for the strong level of authentication.

5. The computer-implemented method of claim 1 wherein the access criteria further comprises a participation threshold indicative of a level of prior participation on the electronic messaging system.

6. The computer-implemented method of claim 5, wherein the participation threshold is a predetermined number of participation-abuse reports; and the method further comprises denying access to the selected thread if a number of participation-abuse reports associated with the user profile associated with the request is equal to or greater than the predetermined number of abuse reports.

7. A computer-implemented method for controlling access to content of an electronic messaging system, the method comprising the steps of:

under control of one or more computer systems configured with executable instructions, receiving a request to access a selected thread of one or more threads of an electronic message board, each thread on the electronic message board having access criteria associated therewith, the access criteria comprising at least two different levels of authentication comprising at least a strong level of authentication and a weak level of authentication;

retrieving access criteria associated with the selected thread;

determining the level of authentication specified by the access criteria for the selected thread and the request;

sending a text message to a mobile phone, determined using user profile information, when the determined level of authentication is the strong level of authentication;

validating at least one of a gender, an age, or a zip code of the user profile information when the determined level of authentication is the weak level of authentication, in order to authorize access the selected thread; and granting access to the selected thread when at least some of the user profile information is validated wherein the request to access the selected thread comprises one of: a request to post a new message to the selected thread, a request to create a new thread on the electronic messaging system, a request to read the selected thread, or a request to reply to a message on the selected thread.

8. The computer-implemented method of claim 7, wherein the user profile information is further capable of, for the strong level of authentication, being validated by:

receiving a text message from the mobile phone in response to the text message sent to the mobile phone; and updating user profile information to indicate that at least some of the user profile information has been verified.

9. The computer-implemented method of claim 8, wherein when the access criteria further indicates that the weak level of authentication is required, the method further comprises:

identifying any waiting periods that limit the access to message content.

10. A system for operating an electronic messaging system comprising:

a processor;

a user profile interface; and a memory device comprising instructions that, when executed by the processor, cause the processor to:

enable access to content of the electronic messaging system through a user interface executing on a computing device;

receive a request to access a selected thread of one or more threads of the electronic messaging system, each thread having access criteria for accessing the thread, the access criteria comprising at least a strong level of authentication and a weak level of authentication for accessing the thread;

authorize access to the selected thread based on user profile information associated and the level of authentication specified by the access criteria associated with the selected thread, the user profile information capable of being validated using a credit card number for the strong level of authentication and capable of being authorized using at least one of a gender, an age, or a zip code for the weak level of authentication.

11. The system of claim 10, wherein the instructions that cause the processor to authorize access to the selected thread further comprise instructions that, when executed by the processor, cause the processor to:

send a text message to a mobile phone, the text message comprising an authentication code that, when entered into an authentication interface of the electronic messaging system, authorizes access to the selected thread.

12. The system of claim 10, wherein the instructions that cause the processor to authorize access to the selected thread further comprise instructions that, when executed by the processor, cause the processor to:

send a text message to a mobile phone;

receive a text message from the mobile phone in response to the text message sent to the mobile phone; and update user profile information associated to indicate that at least some of the user profile information has been verified.

13. The system of claim 10, wherein the instructions when executed by the processor further cause the processor to:

identify any waiting periods imposed that limit the access to content when the access criteria indicates that the weak level of authentication is required.

14. The system of claim 10, wherein the request further comprises a request to post a new message to the electronic messaging system.

15. The system of claim 10, wherein the request further comprises a request to create a new thread on the electronic messaging system.

16. The system of claim 10, wherein the request further comprises a request to read one of the one or more threads on the electronic messaging system.

17. The system of claim 10, wherein the request further comprises a request to reply to a message on the electronic messaging system.

18. The system of claim 10, wherein the access criteria further comprises a participation threshold indicative of a level of prior participation on the electronic messaging system.

19. The system of claim 18, wherein:

the participation threshold is a predetermined number of participation-abuse reports; and the memory device comprising further instructions that, when executed by the processor, cause the processor to deny access to the selected thread if a number of participation-abuse reports associated with the user profile associated with the request is equal to or greater than the predetermined number of abuse reports.

20. A non-transitory computer-readable medium with computer-executable code tangibly embodied thereon for operating an electronic messaging system, comprising:

program code for receiving a request to access a selected thread of one or more threads of a message board, the request being transmitted via a user interface configured to enable access to content of the message board on a computing device, each thread having access criteria for accessing the thread, the access criteria comprising at least a strong level of authentication and a weak level of authentication;

program code for authorizing access to the selected thread based on user profile information associated and the level of authentication specified by the access criteria associated with the selected thread, the user profile information capable of being validated using a credit card number for the strong level of authentication and capable of being authorized using at least one of a gender, and age, or a zip code for the weak level of authentication, wherein the request comprises one of a request to post a new message to the electronic messaging system, a request to create a new thread on the electronic messaging system, a request to read one of the one or more threads on the electronic messaging system, or a request to reply to a message on the electronic messaging system.

21. The non-transitory computer-readable medium of claim 20 wherein the access criteria further comprises a participation threshold indicative of a level of prior participation on the electronic messaging system.

22. The non-transitory computer-readable medium of claim 20 wherein the level of authentication specified by the access criteria is based upon message content of a respective thread.

23. The non-transitory computer-readable medium of claim 20 wherein the user profile information is further capable of being validated using an Internet protocol address associated with the request for a weak level of authentication.

* * * * *